United States Patent
Tov et al.

(10) Patent No.: US 10,846,532 B2
(45) Date of Patent: *Nov. 24, 2020

(54) METHOD AND APPARATUS FOR IDENTIFYING INDIVIDUALS USING AN AUGMENTED-REALITY APPLICATION

(71) Applicant: MOTOROLA SOLUTIONS, INC, Chicago, IL (US)

(72) Inventors: Jacob Shem Tov, Jerusalem (IL); Shahar Kuchuk, Ariel (IL); David Mizrachi, Tel Aviv (IL); Vered Rabaev, Rosh Haayin (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/905,864

(22) Filed: Feb. 27, 2018

(65) Prior Publication Data
US 2019/0266402 A1    Aug. 29, 2019

(51) Int. Cl.
*G06K 9/00*    (2006.01)
*H04L 29/08*    (2006.01)
*G06T 11/60*    (2006.01)

(52) U.S. Cl.
CPC ..... *G06K 9/00671* (2013.01); *G06K 9/00295* (2013.01); *G06T 11/60* (2013.01); *H04L 67/12* (2013.01)

(58) Field of Classification Search
CPC .......... G06K 9/00671; G06K 9/00295; G06T 11/60; H04L 67/12
See application file for complete search history.

(56) References Cited

U.S. PATENT DOCUMENTS

| | | | |
|---|---|---|---|
| 6,704,644 B1 * | 3/2004 | Kobayashi | G06Q 10/10 701/29.1 |
| 9,503,860 B1 * | 11/2016 | Mankovskii | H04W 4/023 |
| 2010/0177193 A1 * | 7/2010 | Flores | G08B 13/126 348/148 |
| 2014/0204119 A1 * | 7/2014 | Malamud | G06F 16/438 345/633 |
| 2014/0368601 A1 * | 12/2014 | deCharms | H04L 65/403 348/14.02 |
| 2018/0018861 A1 * | 1/2018 | Locke | G06F 3/167 |

* cited by examiner

*Primary Examiner* — John W Lee
(74) *Attorney, Agent, or Firm* — Kenneth A. Haas

(57) ABSTRACT

A method and apparatus for identifying individuals using augmented-reality is provided herein. During operation individuals at an incident scene are identified via facial recognition. Residence information for the identified individuals is determined, and the individuals are highlighted in the augmented-reality system based on how far they reside from the incident scene.

8 Claims, 6 Drawing Sheets

METHOD AND APPARATUS FOR IDENTIFYING INDIVIDUALS USING AN AUGMENTED-REALITY APPLICATION

BACKGROUND OF THE INVENTION

Many types of crimes have a higher probability of being committed by someone who resides local to the crime scene, while other types of crimes have a higher probability of being committed by someone who resides farther from the crime scene. For example, a serial bank robber has a higher probability of not residing near many of the banks they rob, while an arsonist will often reside near fires they set. In addition, oftentimes individuals who reside near a crime are reluctant to give information to police officers. Because of the above, it would be beneficial to indicate to an officer which individuals reside near a crime scene, and which individuals do not reside near the crime scene. This information may aide the officer in identifying a suspect or witnesses to a crime.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
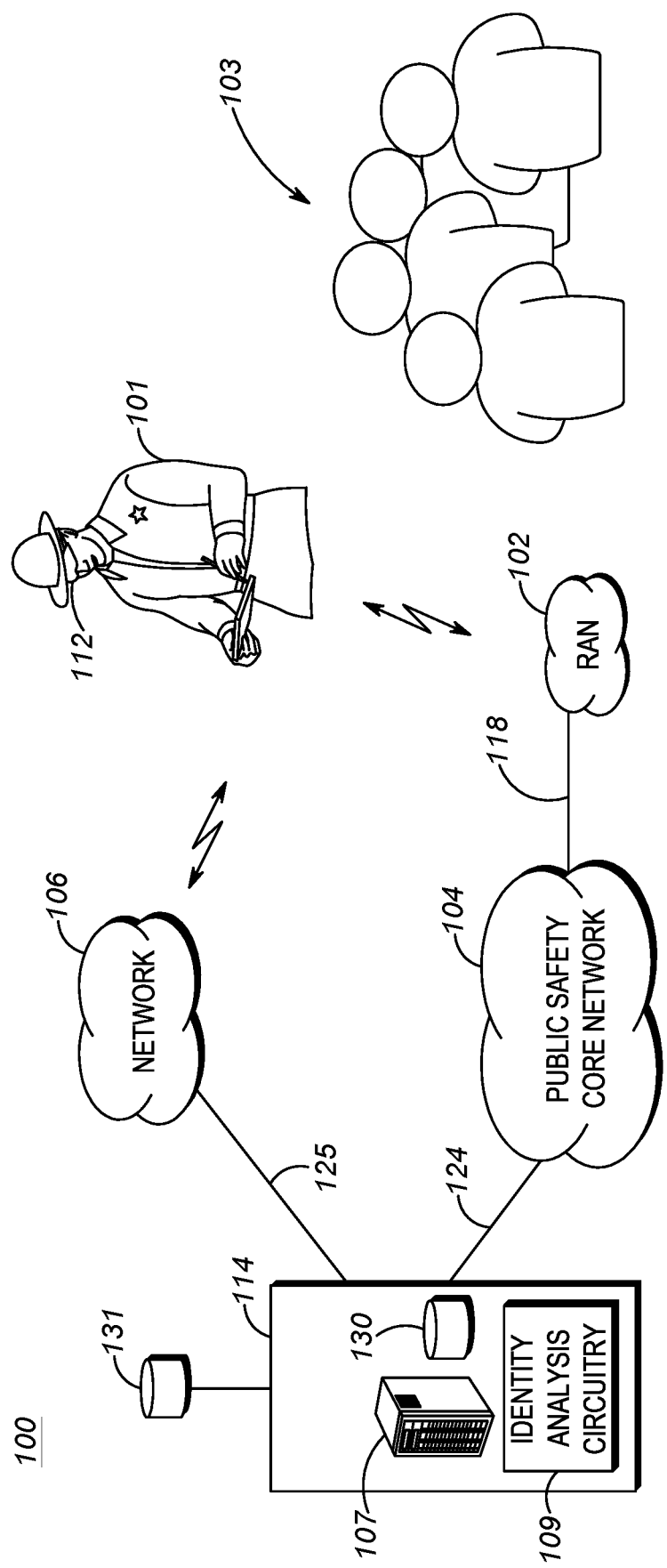
FIG. 1 shows a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for identifying individuals using augmented-reality is provided herein. During operation individuals at an incident scene are identified via facial recognition. Residence information for the identified individuals is determined, and the individuals are highlighted in the augmented-reality system based on how far they reside from the incident scene.

Augmented reality systems utilizes a technology that superimposes a computer-generated image on a user's view of the real world, thus providing a composite view of the real world and the computer-generated image. During operation, a user's surroundings will appear on a device, with the surroundings "augmented" as part of the view provided to a user. During operation each identified individual may be highlighted with various outlines, colors, shapes, . . . , etc. based on how far the individual resides from an incident scene.

For example, all individuals identified as living within a few blocks of the incident scene may be outlined in yellow, while those individuals living beyond 5 miles from the incident scene may be outlined in red. Forms of highlighting may be used, such as, but not limited to:

The system can place a shape having a particular color around an individual based on how far the individual lives from the incident scene. For example, a yellow box may be placed around individuals living within 3 blocks of the incident scene, and a red box may be placed around individuals living over 5 miles from the incident scene.

The system can shade the individual in a particular color based on how far the individual lives from the incident scene. For example, a yellow shading may be placed over individuals living within 3 blocks of the incident scene, and a red shading may be placed over individuals living over 5 miles from the incident scene.

The system can place an object on an individual based upon how far the individual lives from the incident scene. For example, a yellow box may be placed on individuals living within 3 blocks of the incident scene, and a red oval may be placed on individuals living over 5 miles from the incident scene.

An intensity of an individual may be varied based on how far the individual lives from the incident scene. For example, those living close to the incident will with shown with a high intensity (Bold) and others will be faded as function of how close they live from the incident or vice versa.

The following definitions are provided to set the necessary background for utilization of the preferred embodiment of the present invention.

Public-Safety Incident—An event or occurrence that involves first responders e.g., (police, fire, military, coastguard, . . . etc.). Such occurrences include, but are not limited to a fire, a crime, a weather-related event such as a lightning strike, suspicious activity, graffiti, . . . , etc.

Public-Safety Incident Scene—A geographic area surrounding a public-safety incident.

Augmented-Reality Application—Any program or system that superimposes a computer-generated image on a user's view of the real world, thus providing a composite view of the real world and computer-generated image. During execution of such an application, a user's surroundings will appear on a device, with the surroundings "augmented" with images created by the application. Other examples of augmented-reality applications are applications such as a "find-my-car" application for parking lots, mapping applications for route planning, . . . , etc.

Image—a video, picture, or live feed of an object or area.

Virtual Object—An object that is virtual as opposed to real. Such an object may exist as part of an augmented-reality system and used to identify how far an individual resides from an incident scene (i.e., how far the residence of the individual is from the incident scene).

Augmented-Reality Device—A preferably-mobile device that runs an augmented-reality application that places a virtual object or highlighting on individuals as part of an augmented-reality system. The virtual object or highlighting is dependent upon how far the individual lives from the incident scene.

Turing now to the drawings wherein like numerals designate like components, FIG. 1 is a general operating environment 100 for the present invention. Environment 100 includes one or more radio access networks (RANs) 102, a public-safety core network 104, augmented-reality device 112, dispatch center 114, and communication links 125, 118, 124. In a preferred embodiment of the present invention, dispatch center 114 serves as a public-safety dispatch center 114. Server 107 provides the necessary augmented-reality data to an augmented-reality application running on device 112. It should be noted that the term "server" and "logic circuitry" can be used interchangeably, and simply mean circuitry that provides data so that device 112 can highlight individuals as described above.

Server 107 is coupled to system database 130. Database 130 comprises information necessary for server 107 to appropriately provide augmented-reality views to officer 101 via device 112. For example, database 130 may comprise officer information, officer locations, virtual-object locations, . . . , etc. It should be noted that although only one server 107 is shown coupled to database 130, there may exist many servers 107 providing system services to officers, with each server 107 sharing database 130 (or a copy of database 130).

Communication between server 107 and device 112 takes place through an intervening network such as, but not limited to a high-speed data network 106 such as a cellular communication system. Thus, as shown in FIG. 1, two separate networks exist, namely public-safety core network 104 for carrying voice traffic from police radios, and a high-speed network 106 (e.g., Verizon, Spring, AT&T, . . . , etc.) for carrying augmented-reality data.

Each RAN 102 includes typical RAN elements such as base stations, base station controllers (BSCs), routers, switches, and the like, arranged, connected, and programmed to provide wireless service to user equipment (e.g., a police radio (not shown in FIG. 1) operated by officer 101) in a manner known to those of skill in the relevant art.

In a similar manner, network 106 includes elements such as base stations, base station controllers (BSCs), routers, switches, and the like, arranged, connected, and programmed to provide wireless service and data to user equipment (e.g., augmented-reality glasses 112 operated by user 101) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications.

Augmented-reality device 112 may be any suitable computing and communication devices configured to engage in wireless communication over an air interface as is known to those in the relevant art. Augmented-reality device 112 comprises any device capable of running an augmented-reality application for projecting and/or displaying an augmented-reality scene from data obtained from server 107. For example, officer devices 112 may comprise a mobile device running an Android™ or iOS™ operating system and having a GPS receiver capable of determining a location. Such devices include, but are not limited to an augmented-reality headset 112 or a smartphone.

Database 131 comprises a database such as, but not limited to a department of motor-vehicle (DMV) database containing images of individuals and locations of their residences. More particularly, for each state, there exists a database comprising millions of registered drivers along with the address of their residence. Identity Analysis circuitry 109 will receive images of individuals 103 (sent from device 112) and compare the images to those in DMV database 131 in order to identify individuals 103. Once identified, a location of identified individual's residence is obtained from database 131.

Identity analysis circuitry 109 comprises circuitry used to perform facial recognition on individuals at an incident scene. During operation, images of individuals 103 are provided to identity analysis circuitry 109 (from, for example, device 112). Circuitry 109 accesses DMV database 131 to compare an images of unidentified individuals 103 with those images within database 131. (It should be noted that in an alternate embodiment of the present invention the DMV database (or significant portion) is on-site, residing within dispatch center 114).

Thus, during operation, responder 101 will show up at an incident scene and device 112 will provide an image of the scene to analysis circuitry 109. A location of device 112 may also be provided. Identity analysis circuitry 109 will compare the image of the unidentified individuals 103 to those in DMV database 131. If a match is made, address information is determined from DMV database 131 for the identified individual(s). This information is provided to server 107 and stored in database 130. Server 107 will transmit augmented-reality data to device 112 so that individuals may be appropriately highlighted by an augmented-reality application residing on device 112. This data comprises such information shapes, highlighting, individual locations within the image, . . . , etc.

Thus, during operation, a location of residences for identified individuals will be determined by server 107 along with a location of device 112. Based on these geographic locations, a distance can be determined by server 107. The distance comprises a distance from the incident scene (presumed to be the location of device 112) to the residence of the identified individuals. Appropriate augmented reality data may then be sent by server 107 to device 112 so that individuals may be highlighted as described above.

Figure 2:
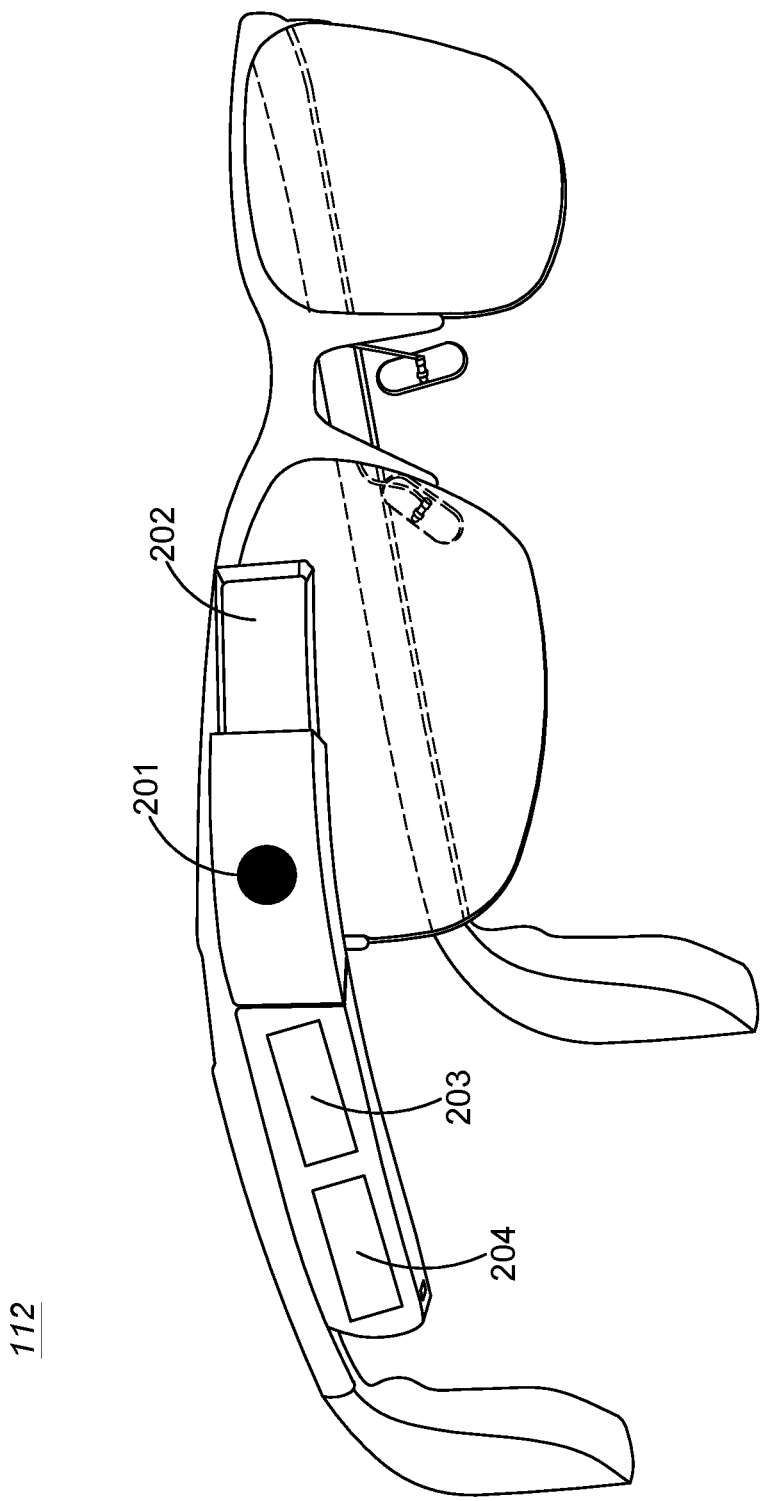
FIG. 2 illustrates an augmented-reality device of FIG. 1.

FIG. 2 illustrates augmented-reality device 112. As shown, device 112 comprises camera 201, virtual-object projector 202, location circuitry (e.g., a GPS receiver) 203, and a transceiver 204. It should be noted that in other augmented-realty devices, projector 202 may be replaced by a screen, such as a touch screen, for displaying an augmented-reality view. During operation camera 201 acquires an image of individuals 103 and location circuitry 203 determines a current location. Both the image of individuals 103 and a location of device 112 are sent to transceiver 204 which sends the image and location to dispatch center 114. In response, transceiver 204 receives augmented-reality data comprising, for example, virtual objects to place over individuals. Projector 202 then projects the image accordingly, with individuals highlighted/shaded as described above.

Figure 3:
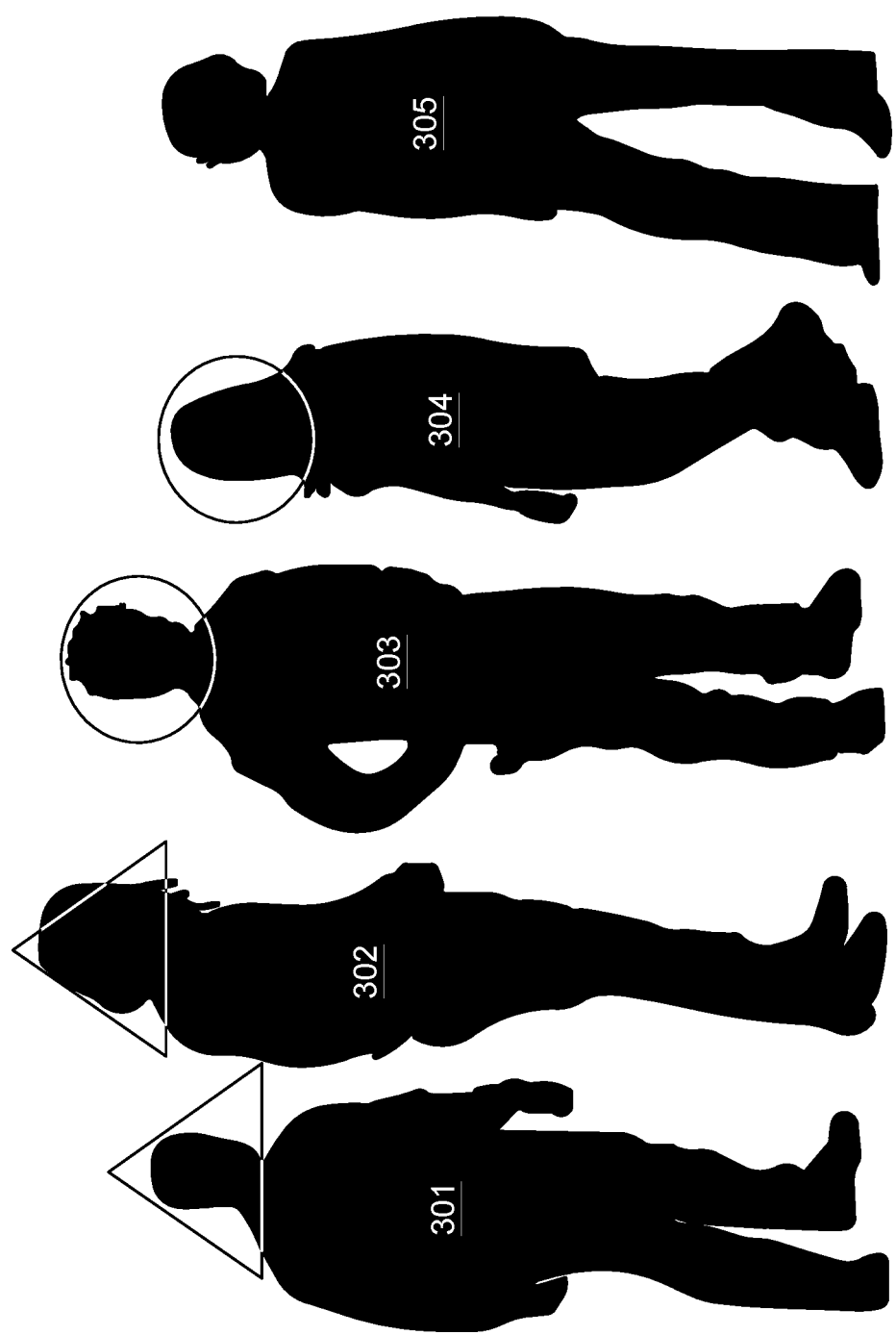
FIG. 3 illustrates the placement of a virtual object over an individual based on a distance from an incident scene to a residence.

FIG. 3 illustrates the placement of a virtual object over an individual based on a distance from an incident scene to a residence (it is assumed that the location of device 112 is the same as the location of the incident scene, but this need not be the case). In this example, individuals 301-304 have been identified while individual 305 has not been identified. In this example, individuals residing within 1 mile of the incident have a virtual triangle (first virtual object) placed over them, while individuals living beyond 1 mile from the incident have a virtual circle placed (second virtual object) over them. As is evident, individuals 301 and 302 reside within a mile of the incident, while individuals 303 and 304 reside beyond 1 mile from the incident.

It should be noted that the above discussion assumes that "the incident" is located at the same location as device 112. When device 112 provides dispatch center 114 its location, it is assumed that the location of device 112 is the same as the location of the incident. Therefore, virtual objects are placed over individuals based on how far their residence is from device 112 (which can be assumed to be the same location as the incident). In an alternative embodiment of the present invention the location of the incident may be determined by dispatch center, without input from device 112. The location may, for example, be an address, a latitude/longitude pair, . . . , etc. The term "location" is meant to comprise a "geographic location" and the two terms can be used interchangeably.

Figure 4:
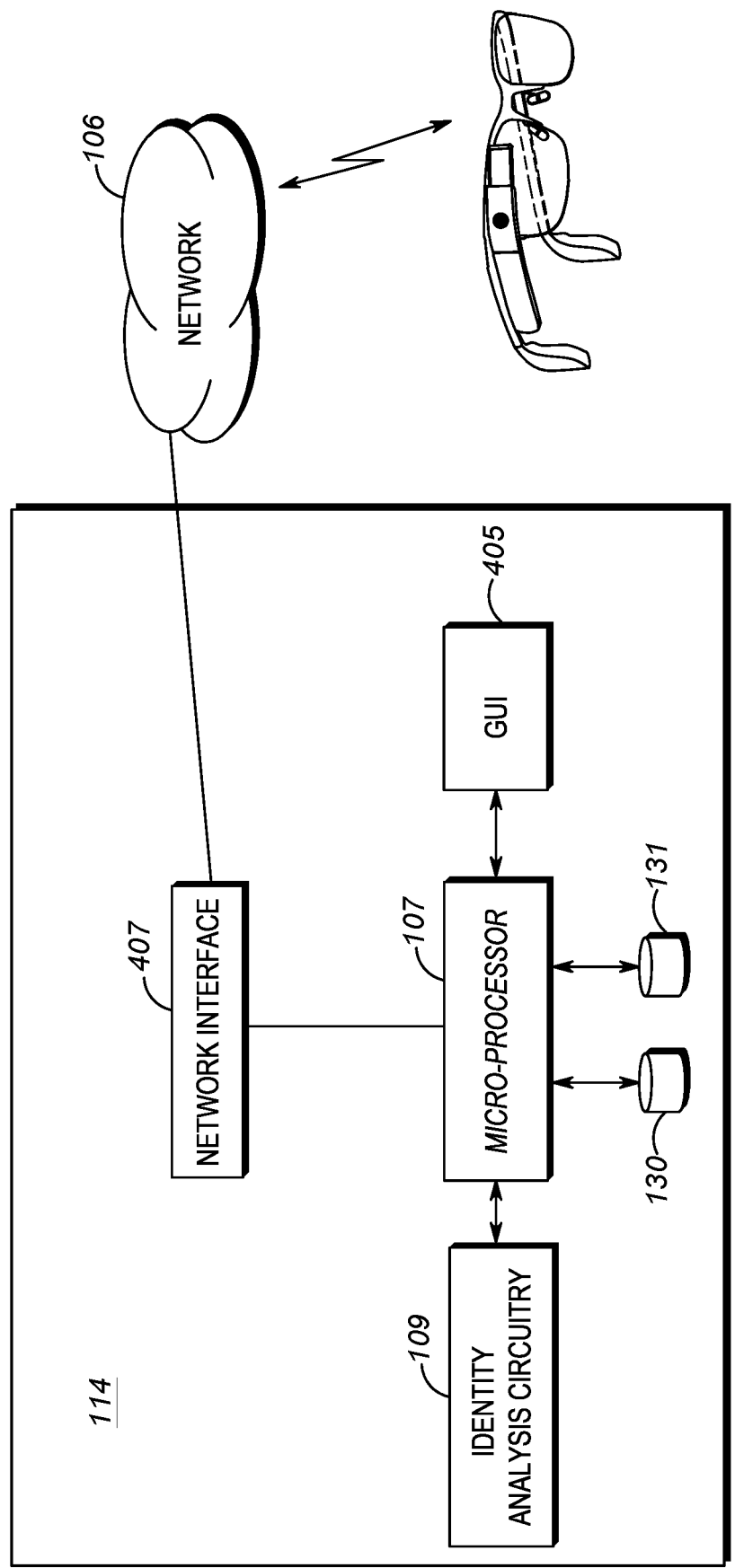
FIG. 4 is a block diagram of a dispatch center of FIG. 1.

FIG. 4 is a block diagram of the dispatch center of FIG. 1. As shown, dispatch center 114 may include network interface 407, which may be wired or wireless. If wireless, network interface 407 comprises at least an over-the-air transmitter and a receiver. Dispatch center 114 also includes graphical-user interface (GUI) 405, logic circuitry 107, and databases 130 and 131 (in this example DMV database 131 is shown internal to dispatch center 114). In other implementations, dispatch center 114 may include more, fewer, or different components.

Graphical-User Interface (GUI) 405 comprises a screen (e.g., a liquid crystal display (LCD), organic light-emitting diode (OLED) display, surface-conduction electro-emitter display (SED), plasma display, field emission display (FED), bistable display, projection display, laser projection, holographic display, etc.) that can display images, maps, incident data, . . . , etc. The input to GUI 405 may be input via a human operator from information obtained, for example, from a 911 emergency call. Such information may comprise information on an incident such as, but not limited to, a location of the incident, a severity of the incident, a type of incident, . . . , etc. In order to provide the above features (and additional features), GUI 405 may include a monitor, a keyboard, a mouse, and/or various other hardware components to provide a man/machine interface.

Logic circuitry 107 serves as server 107 and comprises a digital signal processor (DSP), general purpose microprocessor, a programmable logic device, or application specific integrated circuit (ASIC) and is utilized to receive an image from device 112 and send appropriate augmented-reality data so that individuals can be highlighted as described above.

Databases 130 and 131 comprise standard random-access memory. As discussed above, database 130 comprises augmented-reality data such as virtual objects, locations of virtual objects, . . . , etc. Database 131 comprises images of individuals along with the location of their residence.

In an illustrative embodiment, network 106 is attached (i.e., connected) to dispatch center 114 through network interface 407 and communicates with processor 107. Network 106 is connected via a wired or wireless connection to network interface 407. Network interface 407 includes elements including processing, modulating, and transceiver elements that are operable in accordance with any one or more standard or proprietary wired or wireless interfaces, wherein some of the functionality of the processing, modulating, and transceiver elements may be performed by means of processor 107.

In the illustrative embodiment, network 104 is attached (i.e., connected) to dispatch center 114 through a transmitter and receiver (not shown in FIG. 4), both of which communicate with processor 107. Network 104 is connected to dispatch center 114 via a wireless connection, although this connection may be wired in alternate embodiments.

In the illustrative embodiment, officer devices 112 are attached (i.e., connected) to server 107 through network interface 407 and communicate with processor 107. Network interface 407 is configured to receive an image of individuals from device 112. Network interface 407 is also configured to forward augmented reality data to device 112.

Figure 5:
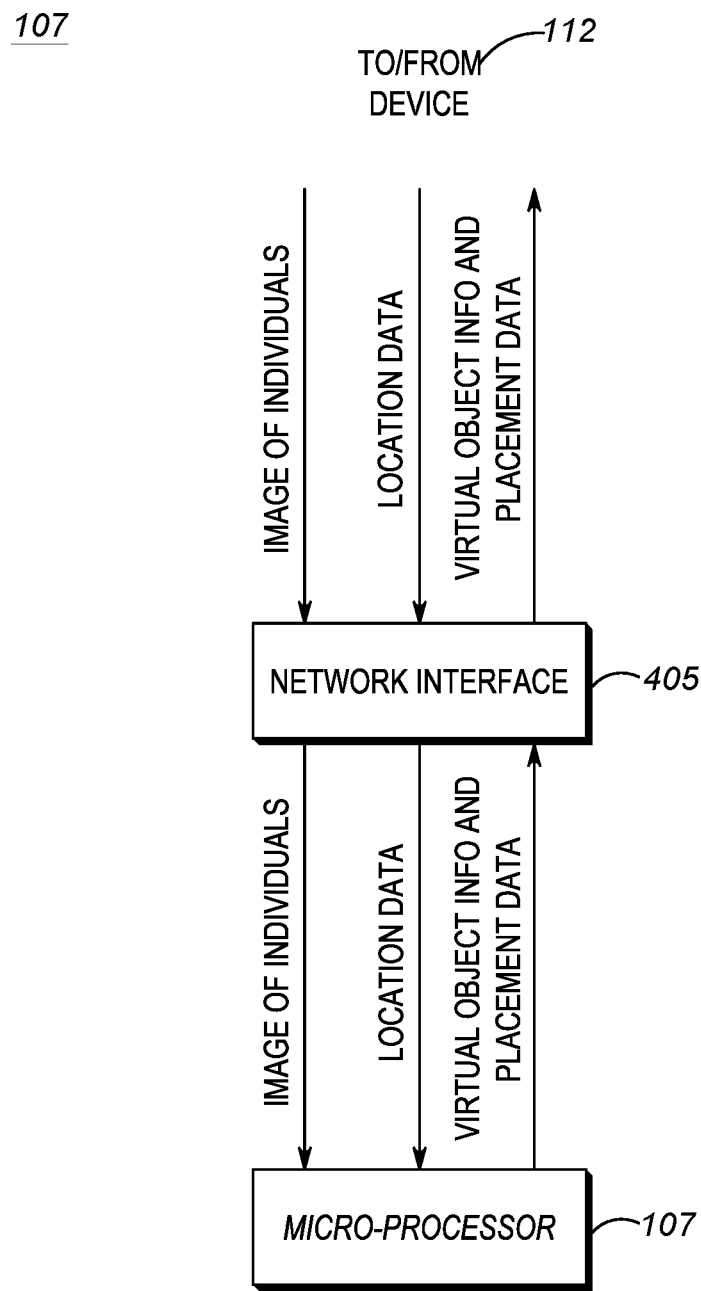
FIG. 5 illustrates data flowing to and from a dispatch center.

FIG. 5 illustrates data flowing to and from dispatch center 114 and to and from device 112. As shown, an image of individuals is received from device 112 at network interface 405 and passed to server 107. Location data may also be received from device 112 at network interface 405 and passed to server 107. As discussed, the location data may comprise a location of device 112 or a location of an incident (the two may be the same). In response to receiving the image and the location data, a virtual object information along with placement data is output to device 112. The virtual object information may comprise such information as a "yellow square", "red circle", . . . , etc. The placement data also comprises information on where to place the virtual object (e.g., identity of a particular individual, x and y coordinates, . . . , etc.).

Thus, FIG. 4 and FIG. 5 provide for an apparatus comprising a network interface configured to receive an image of an individual from a device, a database comprising facial information and residence information, identity analysis circuitry configured to use the facial information for performing facial recognition on the image of the individual, and logic circuitry configured to determine augmented-reality data based on a distance between an incident scene and a residence of the individual. As discussed, the network interface transmits the augmented-reality data to the device.

As discussed above, the network interface comprises a wired network interface or a wireless network interface. Additionally, the augmented-reality data comprises a geometric shape, a color, and/or a shading, . . . , etc.

The augmented-reality data instructs the device to place a first virtual object near the individual if they reside within a first distance from the incident scene, and place a second virtual object near the individual if they reside within a second distance from the incident scene. Alternatively, the augmented-reality data instructs the device to place a first virtual object over the individual if they reside within a first distance from the incident scene, and place a second virtual object over the individual if they reside within a second distance from the incident scene. Alternatively, the augmented-reality data instructs the device to place a first virtual shading over the individual if they reside within a first distance from the incident scene, and place a second virtual shading over the individual if they reside within a second distance from the incident scene.

Figure 6:
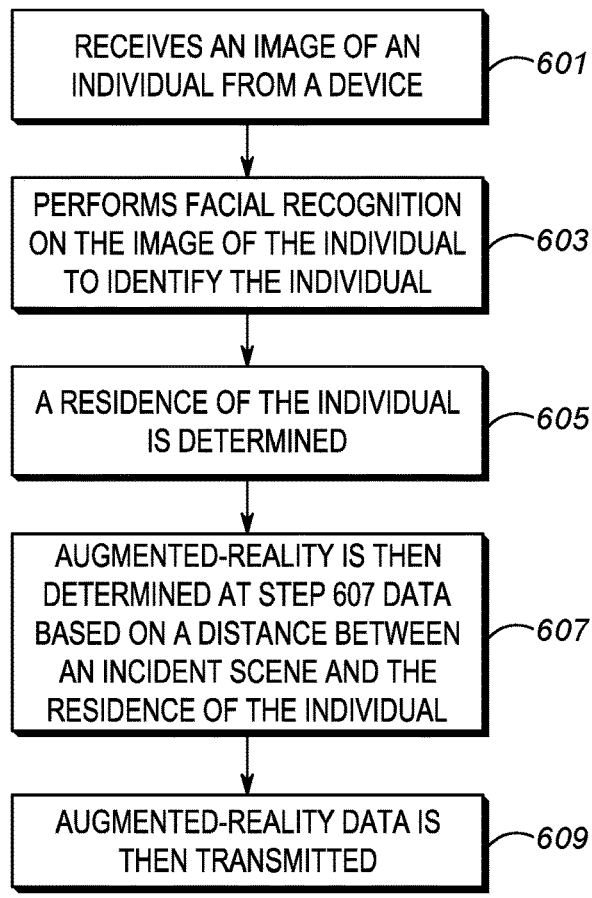
FIG. 6 is a flow chart showing operation of the dispatch center of FIG. 4.

FIG. 6 is a flow chart showing operation of dispatch center 114. The logic flow begins at step 601 where server 107 receives an image of an individual from a device. The image is passed to circuitry 109 where circuitry 109 performs facial recognition on the image of the individual to identify the individual (step 603). As discussed above, this is accomplished by comparing the image of the individual to those in the DMB database 131.

After the individual is identified, and the identity is passed to server 107, a residence of the individual is determined at step 605 by accessing database 131. Augmented-reality data is then determined at step 607 data based on a distance between an incident scene and the residence of the individual. The augmented-reality data is then transmitted to the device at step 609. As discussed, the augmented reality data places a first virtual object/shading near the individual if they reside within a first distance from the incident scene, and places a second virtual object/shading near the individual if they reside within a second distance from the incident scene.

The augmented-reality data may comprise a geometric shape, a color, and/or a shading, and instructs the device to place a first virtual object/shading over the individual if they reside within a first distance from the incident scene, and place a second virtual object/shading over the individual if they reside within a second distance from the incident scene.

The above description showed a distributed system for both identifying a virtual object and then displaying the virtual object. More specifically, dispatch center 114 identified the virtual object, and device 112 displayed the virtual object. It should be noted that such a system does not necessarily need to be distributed. Particularly, the necessary components of dispatch center 114 and device 112 may be combined so that a single device may determine a location of a device, determine a location of residence for an individual, determine a virtual object based on a distance between the location of the device and the location of residence, and display the virtual object such that a first virtual object is placed over the individual if they reside within a first distance from the location of the device, and a second virtual object is placed over the individual if they reside within a second distance from the device.

Figure 7:
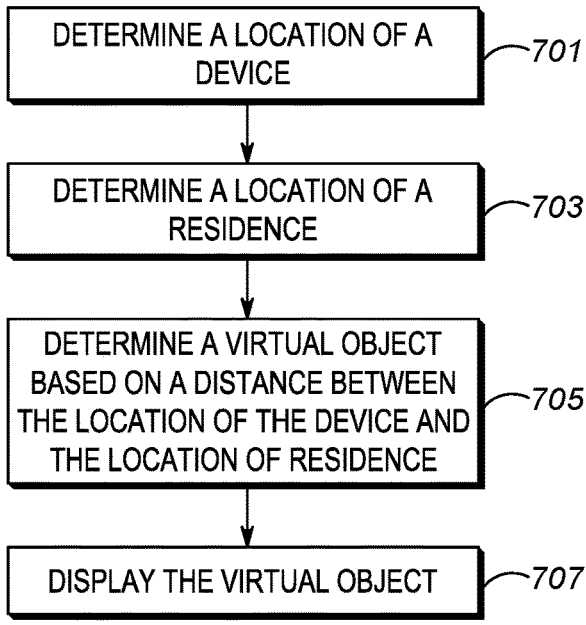
FIG. 7 is a flow chart showing operation of a device generating virtual objects.

The above steps are shown in FIG. 7. The logic flow begins at step 701 where location circuitry determines a location of a device. A location of a residence of an individual is determined at step 703. While the above text described the residence being determined via several steps (i.e., involving facial recognition), this need not be the case. A residence may be determined by any means. At step 705 a virtual object is determined based on a distance between the location of the device and the location of residence. Finally, at step 707 the virtual object is displayed such that a first virtual object is placed near/over the individual if they reside within a first distance from the location of the device, and a second virtual object is placed near/over the individual if they reside within a second distance from the device.

In the foregoing specification, specific embodiments have been described. However, one of ordinary skill in the art appreciates that various modifications and changes can be made without departing from the scope of the invention as set forth in the claims below. For example, while various components have been shown residing in dispatch center 114, one of ordinary skill in the art will recognize that these components may be place elsewhere in environment 100. For example, identity analysis circuitry 109 may lie within device 112. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface configured to receive an image of multiple individuals from a device located at a public-safety incident scene;
   a database comprising facial information and residence information;
   identity analysis circuitry configured to use the facial information for performing facial recognition on the images of the individuals;
   logic circuitry configured to determine augmented-reality data to be placed by individuals based on how far the individuals live from the public-safety incident scene; and
   wherein the network interface transmits the augmented-reality data to the device, wherein the augmented-reality data instructs the device to place a first virtual object near a first individual who resides within a first distance from the public-safety incident scene, and place a second virtual object near a second individual residing within a second distance from the public-safety incident scene.

2. The apparatus of claim 1 wherein the network interface comprises a wired network interface.

3. The apparatus of claim 1 wherein the network interface comprises a wireless network interface.

4. The apparatus of claim 1 wherein the augmented-reality data comprises a geometric shape, a color, or a shading.

5. The apparatus of claim 1 wherein the augmented-reality data instructs the device to place a first virtual shading over the individual if they reside within a first distance from the public-safety incident scene, and place a second virtual shading over the individual if they reside within a second distance from the public-safety incident scene.

6. An method comprising the steps of:
   receiving an image of an individuals from a device;
   performing facial recognition on the image of the individuals to identify the individuals;
   determining residences of the individuals;
   determining augmented-reality data for each individual based on how far the individual live from the public-safety incident scene; and
   transmitting the augmented-reality data to the device, wherein the augmented reality data places a first virtual object or shading near a first individual living a first distance from the public-safety incident scene, and places a second virtual object or shading near a second individual living a second distance from the public-safety incident scene.

7. The method of claim 6 wherein the augmented-reality data comprises a geometric shape, a color, or a shading.

8. An apparatus comprising:
   a network interface configured to receive an image of multiple individuals from a device located at a public-safety incident scene;
   a database comprising facial information and residence information;
   identity analysis circuitry configured to use the facial information for performing facial recognition on the images of the individuals;
   logic circuitry configured to determine augmented-reality data to be placed by individuals based on how far the individuals live from the device; and
   wherein the network interface transmits the augmented-reality data to the device, wherein the augmented-reality data instructs the device to place a first virtual object near a first individual who resides within a first distance from the device, and place a second virtual object near a second individual residing within a second distance from the device.

* * * * *